(12) United States Patent
Fischer et al.

(10) Patent No.: US 7,877,941 B2
(45) Date of Patent: Feb. 1, 2011

(54) LEADTHROUGH FOR A CONDUIT

(75) Inventors: Marco Fischer, Denver, CO (US);
Thomas Monden, Stetten (DE);
Markus Koegler, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 1 day.

(21) Appl. No.: 11/787,988

(22) Filed: Apr. 17, 2007

(65) Prior Publication Data

US 2007/0283644 A1 Dec. 13, 2007

(30) Foreign Application Priority Data

Apr. 19, 2006 (DE) .................. 10 2006 000 184

(51) Int. Cl.
*E04C 2/52* (2006.01)

(52) U.S. Cl. .................. 52/220.8; 52/219; 52/232; 52/220.1; 174/68.1; 174/64; 174/68.3

(58) Field of Classification Search ............... 52/220.1, 52/220.3, 220.8, 232, 219; 174/650, 659, 174/480, 68.1, 68.3, 70 C, 21 R, 24, 64; 285/189, 192, 219, 220
See application file for complete search history.

(56) References Cited

U.S. PATENT DOCUMENTS

| | | | | |
|---|---|---|---|---|
| 469,005 A * | 2/1892 | Anderson | .................. | 126/317 |
| 1,983,840 A * | 12/1934 | Dohner | .................. | 285/341 |
| 3,548,079 A * | 12/1970 | Robert et al. | .......... | 174/153 G |
| 3,761,601 A * | 9/1973 | Kaesser et al. | .............. | 174/659 |
| 3,830,957 A * | 8/1974 | Oberdiear | .................. | 174/78 |
| 3,914,843 A * | 10/1975 | Antonacci | ................ | 29/890.14 |
| 3,948,545 A * | 4/1976 | Bonds | .................. | 285/4 |
| 4,086,736 A * | 5/1978 | Landrigan | .................. | 52/220.8 |
| 4,221,092 A * | 9/1980 | Johnson | .................. | 52/232 |
| 4,232,712 A * | 11/1980 | Squires | .................. | 138/109 |
| 4,242,164 A * | 12/1980 | Skinner | .................. | 156/304.1 |
| 4,261,598 A * | 4/1981 | Cornwall | .................. | 285/56 |
| 4,433,847 A * | 2/1984 | Weinberg | .................. | 277/342 |
| 4,547,623 A * | 10/1985 | Van Brunt et al. | .......... | 174/359 |
| 4,619,087 A * | 10/1986 | Harbeke | .................. | 52/220.8 |
| 4,623,170 A * | 11/1986 | Cornwall | .................. | 285/4 |
| 4,627,647 A * | 12/1986 | Hauff | .................. | 285/189 |
| 4,646,486 A * | 3/1987 | Hauff | .................. | 52/1 |
| 4,669,244 A * | 6/1987 | Szoke | .................. | 52/220.8 |
| 4,669,759 A * | 6/1987 | Harbeke | .................. | 285/136.1 |
| 4,748,787 A * | 6/1988 | Harbeke | .................. | 52/741.3 |
| 4,817,348 A * | 4/1989 | Wydra | .................. | 52/220.8 |
| 4,850,385 A * | 7/1989 | Harbeke | .................. | 137/75 |
| 4,918,761 A * | 4/1990 | Harbeke | .................. | 4/252.4 |
| 4,976,457 A * | 12/1990 | Carter | .................. | 285/136.1 |
| 5,017,024 A * | 5/1991 | Clark et al. | ................ | 384/482 |
| 5,060,986 A * | 10/1991 | Carter | .................. | 285/136.1 |
| 5,079,389 A * | 1/1992 | Nelson | .................. | 174/505 |
| 5,144,777 A * | 9/1992 | Fishel et al. | .................. | 52/144 |
| 5,155,957 A * | 10/1992 | Robertson et al. | ............. | 52/232 |
| 5,237,129 A * | 8/1993 | Obara | .................. | 174/667 |

(Continued)

*Primary Examiner*—Robert J Canfield
*Assistant Examiner*—Matthew J Gitlin
(74) *Attorney, Agent, or Firm*—Abelman, Frayne & Schwab

(57) ABSTRACT

A leadthrough (10) for passing conduits through a constructional component includes a tube (11), a base member (16) arranged at the first axial end (12) of the tube (11) and having a receiving space (18) for isolating means (19) and defining an opening (17), and first (14) and second (15) annular, diaphragm-shaped sealing elements provided, respectively, at the first (12) and second axial ends of the tube (11).

8 Claims, 2 Drawing Sheets

U.S. PATENT DOCUMENTS

| | | | | |
|---|---|---|---|---|
| 5,263,746 | A * | 11/1993 | Cornwall | 285/136.1 |
| 5,347,767 | A * | 9/1994 | Roth | 52/1 |
| 5,351,448 | A * | 10/1994 | Gohlke et al. | 52/1 |
| 5,405,172 | A * | 4/1995 | Mullen, Jr. | 285/92 |
| 5,406,032 | A * | 4/1995 | Clayton et al. | 174/151 |
| 5,543,582 | A * | 8/1996 | Stark et al. | 174/653 |
| 5,798,910 | A * | 8/1998 | Holbeche et al. | 361/809 |
| 5,927,892 | A * | 7/1999 | Teh-Tsung | 403/259 |
| 6,180,882 | B1 * | 1/2001 | Dinh | 174/655 |
| 6,284,976 | B1 * | 9/2001 | Pulido et al. | 174/77 R |
| 6,314,692 | B1 * | 11/2001 | Munzenberger et al. | 52/220.1 |
| 6,336,297 | B1 * | 1/2002 | Cornwall | 52/232 |
| 6,357,188 | B1 * | 3/2002 | Lee et al. | 52/220.8 |
| 6,394,464 | B1 * | 5/2002 | Moreau | 277/603 |
| 6,470,635 | B2 * | 10/2002 | Cornwall | 52/220.8 |
| 6,752,361 | B2 * | 6/2004 | Chou | 248/74.1 |
| 6,792,726 | B1 * | 9/2004 | Price | 52/220.8 |
| 6,941,714 | B2 * | 9/2005 | Nakamura | 52/395 |
| 7,080,486 | B2 * | 7/2006 | Radke et al. | 52/98 |
| 7,635,110 | B2 * | 12/2009 | Galasso et al. | 248/200 |
| 7,810,847 | B1 * | 10/2010 | Cornwall | 285/230 |
| 2001/0001355 | A1 * | 5/2001 | Shimizu | 52/220.1 |
| 2002/0032996 | A1 * | 3/2002 | Cornwall | 52/220.8 |
| 2003/0172603 | A1 * | 9/2003 | McKesson | 52/232 |
| 2004/0168398 | A1 * | 9/2004 | Sakno et al. | 52/741.4 |

* cited by examiner

LEADTHROUGH FOR A CONDUIT

BACKGROUND OF THE INVENTION

1. Field of the Invention

The present invention relates to a leadthrough for passing conduits through a constructional component and including a tube, a base member arranged at the first axial end of the tube and having a receiving space for isolating means and defining an opening, and an annular, diaphragm-shaped sealing element provided at the first axial end of the tube.

2. Description of the Prior Art

Leadthroughs of the type described above are used for passing conduits such as, e.g., tubular conduits, cables, cable channels, through constructional components such as, e.g., ceilings or walls.

Leadthroughs of the type discussed above, are embedded in the constructional components such as walls or ceilings during their formation. In particular, the leadthroughs can be cast in the concrete ceilings or walls. Preferably, such leadthroughs perform fire protection functions. From the time of embedding or cast-in of the leadthrough and passing of a conduit therethrough up to completion of the building, the fire protection has already been provided. In such leadthroughs, the important thing is their internal leak tightness against liquid media such as, e.g., water.

U.S. Patent Publication US 2004 0016190 A1 discloses a device for passing through conduits and having a tube and a base member connectable with the tube. The base member has a receiving space for isolating means and defines an opening. The isolating means is formed by an intumescent mass that expands in case of fire, closing the through-opening. Between the isolating means and a shoulder, there is provided an annular, diaphragm-shaped seal formed of an elastomeric material and having an opening that is smaller than the through-opening of the tube.

The drawback of the device of the U.S. Publication described above consists in that in case of its mounting in a ceiling, no absolute internal leak tightness for passing a conduit through can be provided with available seals. Thus, liquid can leak along a seam between the leadthrough and the conduit extending therethrough. This is problematic, in particular, during a constructional phase of the building.

Accordingly, an object of the present invention is a leadthrough for passing conduits through constructional components having an improved leak tightness in the mounted condition of a conduit.

SUMMARY OF THE INVENTION

This and other objects of the present invention, which will become apparent hereinafter, are achieved by providing a leadthrough of the type described above and further including a second annular diaphragm-shaped sealing element provided at the second axial end of the tube.

The second sealing element insures almost absolute leak tightness with a conduit passing through the leadthrough. A further advantage of the second sealing plane, in particular when the conduit passes through the ceiling, consists in that the edge clearance between the tube and the tubular conduit is closed at the top. As a result, neither moisture nor impurities of any type can penetrate through the edge gap and, thus, deposition and growth of mold that can be damaging to health, can be completely prevented.

It is advantageous when there is provided a stiff annular member for mounting the second diaphragm-shaped sealing element at the second axial end of the tube. Thereby, the sealing element at the stiff annular member form a module that can be secured, if needed, on the tube. This makes possible a flexible adaptation of the inventive leadthrough to the required tightness.

It is further advantageous when there is provided an annular securing part connectable with tube for securing the stiff annular member at the second axial end of the tube. The annular securing part can be formed as a cover for closing the leadthrough as long as no conduit extends through the leadthrough. Advantageously, the tube has an outer thread, and the securing part has an inner thread for screwing the securing part at the second end of the tube. With the securing part, the module, which is formed of the second sealing element and the stiff annular member, can be easily mounted on the tube.

Advantageously, the stiff annular member is formed of a hard plastic material which insures its easy mounting. Further, the material combination of a plastic tube and a plastic stiff annular member insures a water-tight connection of the tube with the stiff annular member. Further, a hard plastic material has production-technical advantages such as efficient manufacturing capability, while insuring mechanical stability, and provides for a required service life of the leadthrough and a reliable function, without danger of any corrosion and, thus, of an adverse influence on the fire protection function.

Optimal sealing characteristics are achieved when the diaphragm-shaped sealing element is formed of a rubber-elastic material which seamlessly sealingly engages the outer surface of a conduit when the conduits extends through the leadthrough.

The module of the sealing element and the stiff annular member is conveniently produced when the sealing element is secured in the stiff annular member in a material-locking manner. The diaphragm-shaped sealing element can be connected with the stiff annular member by vulcanization or being glued thereto, forming a unit therewith.

The novel features of the present invention, which are considered as characteristic for the invention, are set forth in the appended claims. The invention itself, however, both as to its construction and its mode of operation, together with additional advantages and objects thereof, will be best understood from the following detailed description of the preferred embodiment, when read with reference to the accompanying drawings.

DETAILED DESCRIPTION OF THE PREFERRED EMBODIMENT

Figure 1:
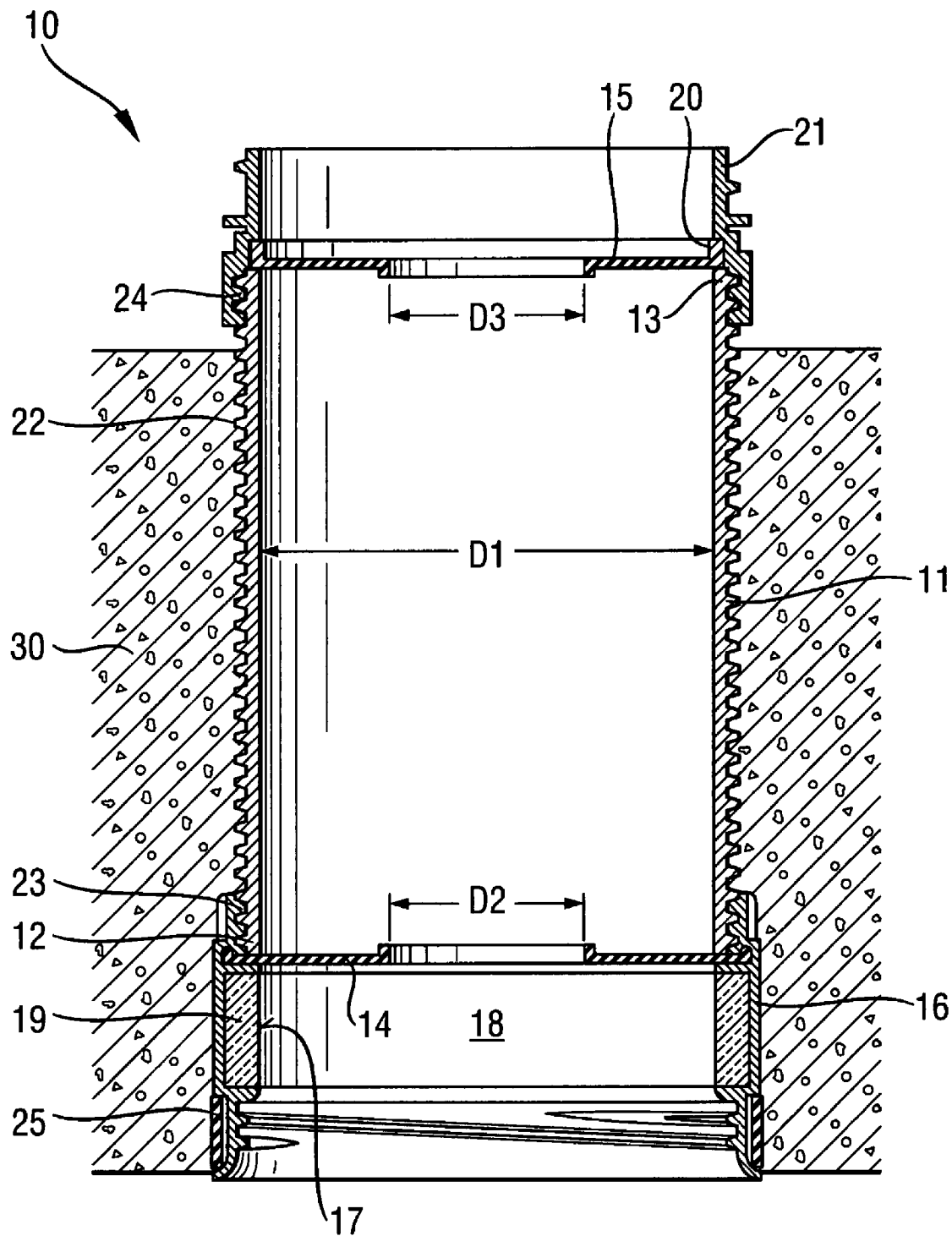
FIG. 1 a cross-sectional longitudinal view of a conduit leadthrough according to the present invention with a tube embedded in a wall.

A leadthrough 10 according to the present invention and which is arranged, as shown in FIG. 1, in a constructional component 30 such as, e.g., a concrete wall, includes a tube 11 with an outer thread that extends over the entire longitudinal extent of the tube 11. The leadthrough 10 further includes a base member 16 having a receiving space 18 for an isolating means 19 and defining an opening 17. The isolating means 19 in form, e.g., of a ring of an intumescent material, ensures fire protection of the leadthrough 10. The outer sealing of the leadthrough 10 relative to a constructional component 30, which surrounds the leadthrough 10 is effected with a sealing ring 25 provided on the outer surface of the base member 16.

In FIG. 1, the leadthrough 10 is formed as a cast-in part that is secured, before formation of the constructional component 30, on a formwork (not shown) and becomes embedded in the constructional component 30 upon filling the formwork with concrete. To this end, there is provided, on the base member 16, a flange (not shown in the drawings) having attachment openings for securing the base member 16 on the formwork with nails or the like.

The base member 16 has a first inner thread 23 with which the base member 16 is secured on a first end 12 of the tube 11 that is provided with the outer thread 23. Between the base member 16 and the tube 11, there is provided an annular, diaphragm-shaped sealing element 14 of a rubber-elastic material and having an inner diameter D2 that is smaller than the inner diameter D1 of the tube 11. The diaphragm-shaped sealing element 14 defines the first sealing plane of the leadthrough 10.

At the opposite axial end 13 of the tube 11, there is provided another annular, diaphragm-shaped sealing element 15 from a rubber-elastic material and having an inner diameter D3 that is likewise smaller than the inner diameter D1 of the tube 11 and that corresponds, within manufacturing tolerances, to the inner diameter D2 of the diaphragm-shaped sealing element 14. The second diaphragm-shaped sealing element 15 defines the second sealing plane of the leadthrough 10.

Figure 2:
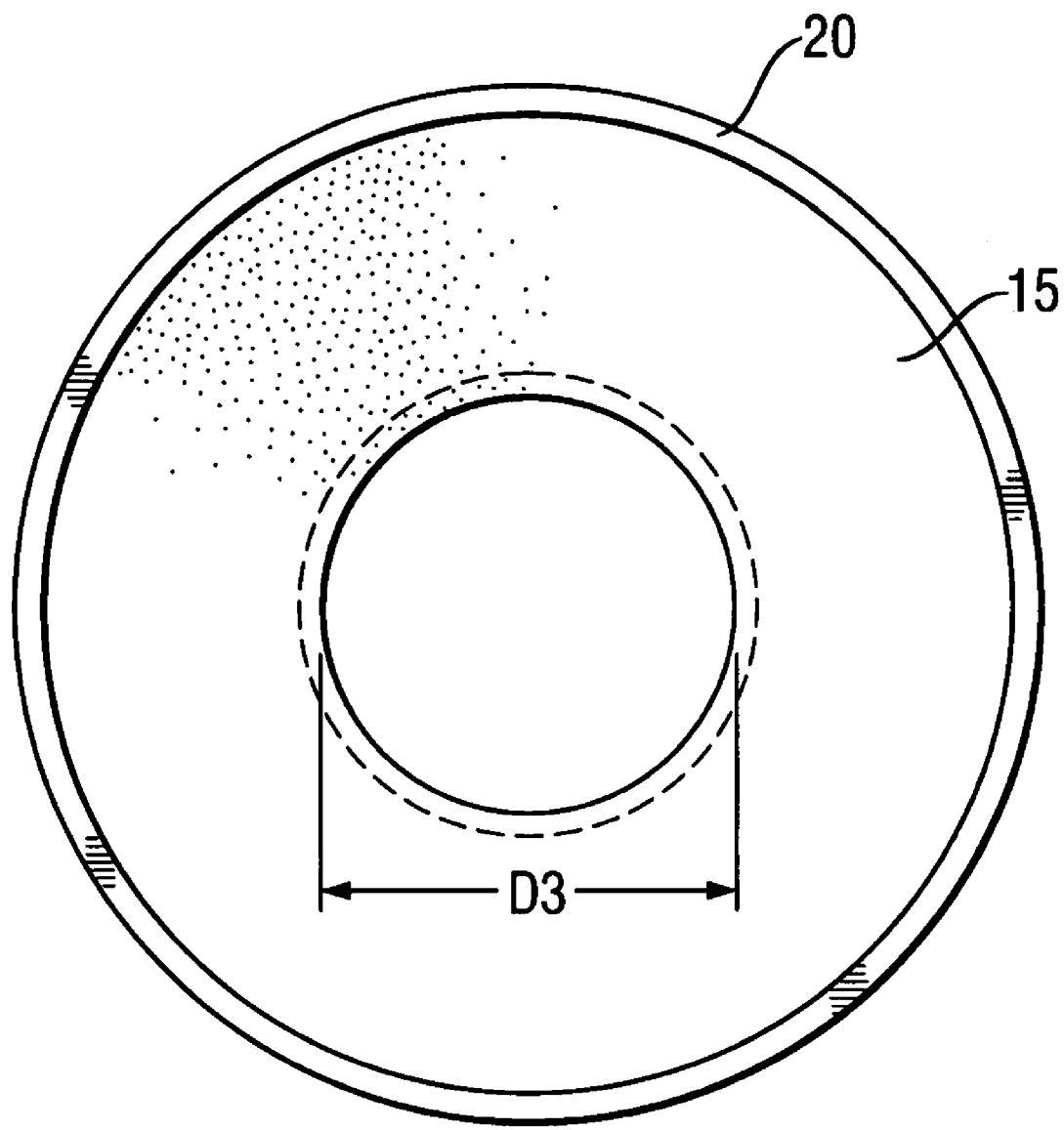
FIG. 2 a top view of the leadthrough shown in FIG. 1.

As particularly shown in FIG. 2, the second diaphragm-shaped sealing element 15 is arranged in a stiff annular member 20 formed of a hard plastic material in which it is secured by so-called material-locking, e.g., by vulcanization or being glued thereto, forming a module. The annular member 20 is secured on the tube 11, as shown in FIG. 1, by an annular securing part 21 which also can be formed as a closing cap or cover and which has a second inner thread 24 that cooperates with the outer thread 22 of the tube 11 for screwing the member 20 on the second end 13 of the tube 11.

When a conduit is passed through a through-opening 17 of the leadthrough 10, e.g., in form of a pipe (not shown), both diaphragm-shaped sealing elements 14, 15 expand, becoming sealingly attached, film-like, to the outer surface of the conduit. The conduit has a diameter that advantageously corresponds to the inner diameter D1 of the tube 11. An almost absolute sealing passing of the conduit through the leadthrough 10 is achieved. The openings of the sealing elements 14, 15 can be provided with collars to insure a sufficient contact surface even when small expansion takes place.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A leadthrough (10) for passing conduits through a constructional component, comprising a tube (11) having first (12) and second (13) axial ends; a base member (16) arranged at the first axial end (12) of the tube (11) coaxially therewith and having a receiving space (18); ring-shaped isolating means (19) defining an opening (17) and received in the receiving space (18) of the base member (16); a first, annular, diaphragm-shaped sealing element (14) provided at the first axial end (12) of the tube (11) and arranged between the base member (16) and the tube (11) inwardly of the ring-shaped isolating means (19) for sealing a passing conduit against the tube (11) at the first end (12) of the tube (11); and a second, annular, diaphragm-shaped sealing element (15) provided at the second end (13) of the tube (11) for sealing the passing conduit against the tube (11) at the second end (13) of the tube (11) and releasably secured to the tube (11) by thread means.

2. A leadthrough according to claim 1 comprising a stiff annular member (20) for releasably mounting the second diaphragm-shaped sealing element (15) on the second axial end (13) of the tube (11).

3. A leadthrough according to claim 2, further comprising an annular securing part (21) connectable with tube (11) for securing the stiff annular member (20) on the second axial end (13) of the tube (11).

4. A leadthrough according to claim 3, wherein the thread means that releasably secures the second sealing element (15) to the tube (11) comprises an inner thread (24) provided on annular securing part (21) and cooperating with an outer thread (22) provided on the tube (11).

5. A leadthrough according to claim 2, wherein the stiff annular member (20) is formed of a hard plastic material.

6. A leadthrough according to claim 2, wherein the stiff annular member (20) is formed of a rubber-elastic material.

7. A leadthrough according to claim 2, wherein the second diaphragm-shaped sealing element (15) is secured within the stiff annular member (20) in material-locking manner.

8. A leadthrough according to claim 2, wherein the second, annular, diaphragm-shaped sealing element (15) is fixedly secured in the stiff annular member (20), forming a module therewith.

* * * * *